(12) United States Patent
Valentine et al.

(10) Patent No.: US 10,048,105 B2
(45) Date of Patent: Aug. 14, 2018

(54) SYSTEM AND METHOD FOR PROVIDING A SELF VALIDATING MASS FLOW CONTROLLER AND MASS FLOW METER

(71) Applicant: Illinois Tool Works Inc., Glenview, IL (US)

(72) Inventors: Bill Valentine, Glenview, IL (US); Chris Ellec, Glenview, IL (US); Berwin Banares, Glenview, IL (US); John Lull, Glenview, IL (US); Anthony Kehoe, Glenview, IL (US)

(73) Assignee: Illinois Tool Works Inc., Glenview, IL (US)

( * ) Notice: Subject to any disclaimer, the term of this patent is extended or adjusted under 35 U.S.C. 154(b) by 189 days.

(21) Appl. No.: 14/378,560

(22) PCT Filed: Mar. 4, 2013

(86) PCT No.: PCT/US2013/028910
§ 371 (c)(1),
(2) Date: Aug. 13, 2014

(87) PCT Pub. No.: WO2013/134147
PCT Pub. Date: Sep. 12, 2013

(65) Prior Publication Data
US 2015/0007897 A1    Jan. 8, 2015

Related U.S. Application Data

(60) Provisional application No. 61/607,963, filed on Mar. 7, 2012.

(51) Int. Cl.
*G01F 1/88*    (2006.01)
*G01F 25/00*   (2006.01)
(Continued)

(52) U.S. Cl.
CPC ............... *G01F 1/88* (2013.01); *G01F 1/68* (2013.01); *G01F 5/00* (2013.01); *G01F 25/0007* (2013.01);
(Continued)

(58) Field of Classification Search
None
See application file for complete search history.

(56) References Cited

U.S. PATENT DOCUMENTS 5,062,446 A    11/1991  Anderson
5,911,238 A *   6/1999  Bump ................. G01F 1/6842
                                                73/204.15
(Continued)

FOREIGN PATENT DOCUMENTS

GB    2 176 313 A    12/1986
JP    59020078       2/1984
(Continued)

OTHER PUBLICATIONS

International Search Report and Written Opinion dated May 3, 2013 for International PCT Application PCT/US2013/028910.

*Primary Examiner* — Jill Culler
(74) *Attorney, Agent, or Firm* — McGuireWoods LLP (57) ABSTRACT

The disclosed embodiments include a method, apparatus, and computer program product for providing a self-validating mass flow controller or mass flow meter without requiring any software modification to a tool/tool controller in which the mass flow controller is being utilized. For example, the disclosed embodiments include a mass flow controller comprising an internal valve configured to receive a first pneumatic line coupled to a tool pilot valve and couple a second pneumatic line from the internal valve to an external isolation valve upstream of the inlet. The mass flow controller also includes at least one processing component configured to execute instructions to perform an in-situ rate of decay measurement after executing instructions to close the external isolation valve by using the internal valve to block airflow being received through the first pneumatic line.

20 Claims, 6 Drawing Sheets

(51) Int. Cl.
*G01F 1/68* (2006.01)
*G01F 5/00* (2006.01)
*G05D 7/06* (2006.01)

(52) U.S. Cl.
CPC ....... *G01F 25/0053* (2013.01); *G05D 7/0635* (2013.01); *Y10T 137/7761* (2015.04); *Y10T 137/87684* (2015.04)

(56) References Cited

U.S. PATENT DOCUMENTS

| | | | | |
|---|---|---|---|---|
| 6,125,869 | A * | 10/2000 | Horiuchi | F16K 37/0091 73/1.35 |
| 6,443,174 | B2 * | 9/2002 | Mudd | G01F 1/6842 137/10 |
| 7,204,155 | B2 * | 4/2007 | Lane | C23C 16/45557 73/861 |
| 7,881,886 | B1 * | 2/2011 | Shareef | G01F 1/36 73/37 |
| 2005/0106080 | A1 | 5/2005 | Evans et al. | |
| 2011/0011183 | A1 | 1/2011 | Monkowski et al. | |
| 2011/0022334 | A1 | 1/2011 | Ding et al. | |

FOREIGN PATENT DOCUMENTS

| | | |
|---|---|---|
| JP | 2007511660 | 5/2007 |
| JP | 2008170410 | 7/2008 |
| JP | 2011-510404 | 3/2011 |
| JP | 6-119059 | 4/2017 |

\* cited by examiner

SYSTEM AND METHOD FOR PROVIDING A SELF VALIDATING MASS FLOW CONTROLLER AND MASS FLOW METER

BACKGROUND OF THE INVENTION

1. Field of the Invention

The present invention relates generally to methods and systems for determining the mass flow rate of a fluid, and more particularly to the operation of mass flow controllers and mass flow meters.

2. Discussion of the Related Art

Many industrial processes require precise control of various process fluids. For example, in the semiconductor industries, mass flow meters (MFMs) are used to precisely measure the amount of a process fluid that is introduced to a process chamber. In addition to measuring the mass flow, mass flow controllers (MFCs) are used to precisely measure and control the amount of a process fluid that is introduced to a process chamber. It is to be understood that the term fluid as used herein applies to any type of gas or vapor to which controlled flow may be of interest.

Mass flow controllers and mass flow meters have well defined performance criteria that are guaranteed by the MFC suppliers. Customer processes are based on repeatable performances from the devices after initial installation and process tune up. Mass flow controllers and mass flow meters that drift (e.g. due to aging) or get clogged (e.g. due to contamination) will cause a loss of repeatability that causes the process characteristics to change and will lead to lower yield or even total loss of the product being manufactured.

One typical implementation to detect this loss of performance is to make a rate of decay (ROD) measurement while the mass flow controller is flowing at a given setpoint to verify that the device characteristics have not changed. Starting a rate of decay measurement is done by interrupting the gas supply upstream of the pressure sensor and letting the pressure decay. Actual flow is directly proportional to the slope of the pressure decay. This process is performed off-line, meaning it requires the tool (i.e., the device utilizing the MFC or MFM) to stop processing wafers while the test is running. Since this impacts the customer's profits, it is not done very often, which could lead to running a process with low yield for an extended period of time.

To combat one or more of these problems, the disclosed embodiments include a system and method for providing a self-validating mass flow controller or mass flow meter. This will enable the mass flow controller or mass flow meter to provide real time information without requiring down time to make the measurements.

BRIEF SUMMARY OF THE INVENTION

The disclosed embodiments include a method, apparatus, and computer program product for providing a self-validating mass flow controller or mass flow meter without requiring any software modification to a tool/tool controller in which the mass flow controller or mass flow meter is being utilized. This would require no added cost or complexity to the customer because the disclosed modification to the device is backward compatible with existing tool installations as the tool software is not being modified. Other advantages of the disclosed embodiments include, but are not limited to, providing a self-validating mass flow controller and mass flow meter that eliminates the requirement of having a separate device installed on the tool to perform a rate of decay measurement for determining valve leak.

As an example, the disclosed embodiments include an apparatus comprising an inlet for receiving the fluid from a gas delivery line having an external isolation valve upstream of the inlet; a flow path in which the fluid passes through the mass flow controller; a mass flow sensor for providing a signal corresponding to mass flow of the fluid through the flow path; an adjustable valve for regulating the flow of the fluid out of an outlet of the mass flow controller; a controller configured to apply a valve control signal to adjust the adjustable valve to a desired valve position to control the flow of the fluid out of an outlet of the mass flow controller; an internal valve configured to receive a first pneumatic line coupled to a tool pilot valve and couple a second pneumatic line from the internal valve to an external isolation valve upstream of the inlet; and at least one processing component configured to execute instructions to perform an in-situ rate of decay measurement after executing instructions to close the external isolation valve by using the internal valve to block airflow being received through the first pneumatic line.

The disclosed embodiments also include an apparatus comprising an inlet for receiving the fluid from a gas delivery line having an external isolation valve upstream of the inlet; a flow path in which the fluid passes through the mass flow controller; a mass flow sensor for providing a signal corresponding to mass flow of the fluid through the flow path; an adjustable valve for regulating the flow of the fluid out of an outlet of the mass flow controller; a controller configured to apply a valve control signal to adjust the adjustable valve to a desired valve position to control the flow of the fluid out of an outlet of the mass flow controller; an electrical relay configured to be coupled between a first electrical line from a tool controller and a second electrical line to a tool pilot valve; and at least one processing component configured to execute instructions to perform an in-situ rate of decay measurement after executing instructions to close the external isolation valve by sending a close valve signal to the tool pilot valve via the second electrical line.

Additionally, the disclosed embodiments also include an apparatus comprising: an inlet for receiving the fluid from a gas delivery line having an external isolation valve upstream of the inlet; a flow path in which the fluid passes through the mass flow controller; a mass flow sensor for providing a signal corresponding to mass flow of the fluid through the flow path; an adjustable valve for regulating the flow of the fluid out of an outlet of the mass flow controller; a controller configured to apply a valve control signal to adjust the adjustable valve to a desired valve position to control the flow of the fluid out of an outlet of the mass flow controller; an electrical relay configured to be coupled the external isolation valve; and at least one processing component configured to execute instructions to perform an in-situ rate of decay measurement after executing instructions to close the external isolation valve by sending a close valve signal to the external isolation valve.

Each of the above described mass flow controller embodiments may similarly be configured in a mass flow meter (i.e., a device that measures mass flow rates, but does not include a controller that controls the rate of flow).

Still, the disclosed embodiments also include an isolation valve comprising a first valve configured to be coupled to a pneumatic line, the first valve configured to open in response to receiving air flow from the pneumatic line; and a second valve configured to receive an electrical signal, the second valve operable to block the air flow from the pneumatic line to cause the first valve to close.

Additional embodiments, advantages, and novel features are set forth in the detailed description.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION

The disclosed embodiments include a system and method for providing a self-validating mass flow controller without requiring software modification to a tool/tool controller in which the mass flow controller is being utilized.

The disclosed embodiments and advantages thereof are best understood by referring to FIGS. 1-8 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments. Further, the illustrated figures are only exemplary and are not intended to assert or imply any limitation with regard to the environment, architecture, design, or process in which different embodiments may be implemented.

Figure 1:
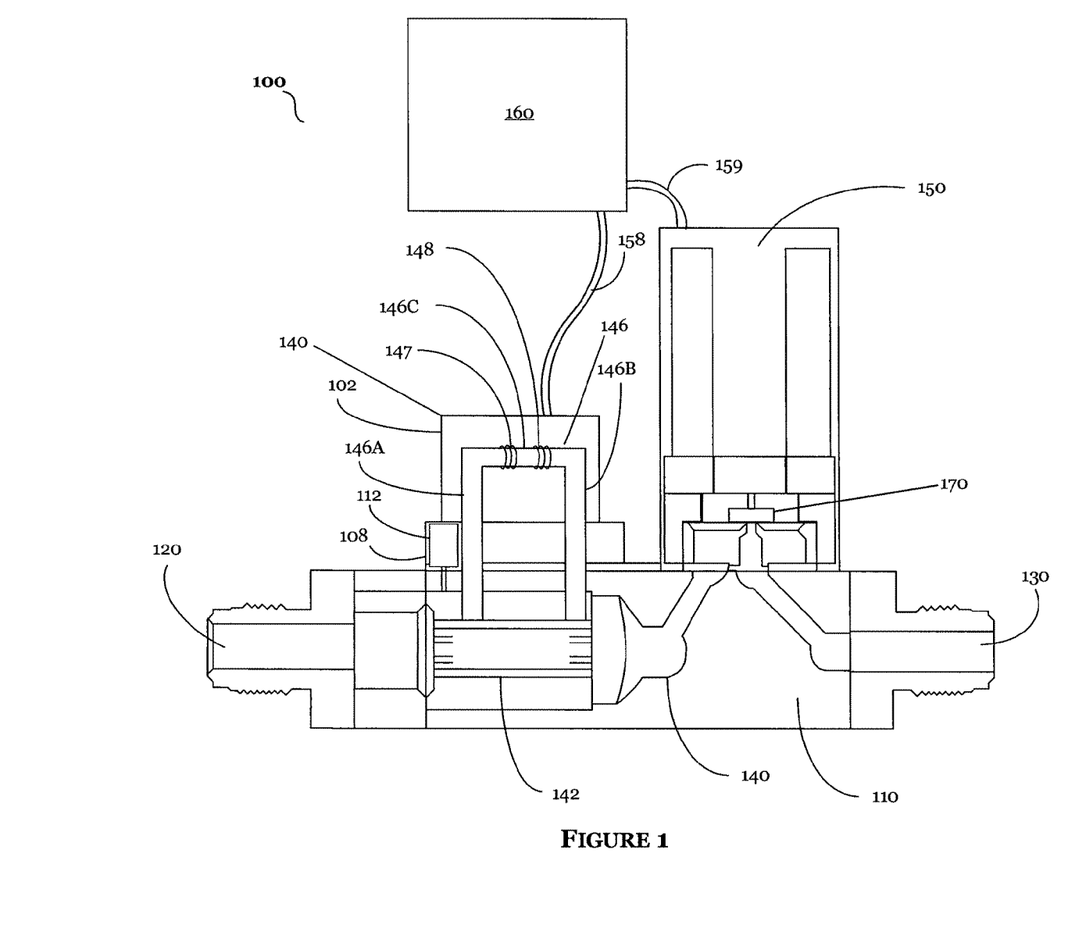
FIG. 1 illustrates typical components of a mass flow controller in accordance with the disclosed embodiments.

FIG. 1 shows schematically a typical mass flow controller 100 that includes a step 110, which is a platform on which the components of the MFC are mounted. A thermal mass flow meter 140 and a valve assembly 150 containing a valve 170 are mounted on the step 110 between a fluid inlet 120 and a fluid outlet 130. The thermal mass flow meter 140 includes a bypass 142 through which typically a majority of fluid flows and a thermal flow sensor 146 through which a smaller portion of the fluid flows.

Thermal flow sensor 146 is contained within a sensor housing 102 (portion shown removed to show sensor 146) mounted on a mounting plate or base 108. Sensor 146 is a small diameter tube, typically referred to as a capillary tube, with a sensor inlet portion 146A, a sensor outlet portion 146B, and a sensor measuring portion 146C about which two resistive coils or windings 147, 148 are disposed. In operation, electrical current is provided to the two resistive windings 147, 148, which are in thermal contact with the sensor measuring portion 146C. The current in the resistive windings 147, 148 heats the fluid flowing in measuring portion 146 to a temperature above that of the fluid flowing through the bypass 142. The resistance of windings 147, 148 varies with temperature. As fluid flows through the sensor conduit, heat is carried from the upstream resistor 147 toward the downstream resistor 148, with the temperature difference being proportional to the mass flow rate through the sensor.

An electrical signal related to the fluid flow through the sensor is derived from the two resistive windings 147,148. The electrical signal may be derived in a number of different ways, such as from the difference in the resistance of the resistive windings or from a difference in the amount of energy provided to each resistive winding to maintain each winding at a particular temperature. Examples of various ways in which an electrical signal correlating to the flow rate of a fluid in a thermal mass flow meter may be determined are described, for example, in commonly owned U.S. Pat. No. 6,845,659, which is hereby incorporated by reference. The electrical signals derived from the resistive windings (147 and 148) after signal processing comprise a sensor output signal.

The sensor output signal is correlated to mass flow in the mass flow meter so that the fluid flow can be determined when the electrical signal is measured. The sensor output signal is typically first correlated to the flow in sensor 146, which is then correlated to the mass flow in the bypass 142, so that the total flow through the flow meter can be determined and the control valve 170 can be controlled accordingly. The correlation between the sensor output signal and the fluid flow is complex and depends on a number of operating conditions including fluid species, flow rate, inlet and/or outlet pressure, temperature, etc.

The process of correlating raw sensor output to fluid flow entails tuning and/or calibrating the mass flow controller and is an expensive, labor intensive procedure, often requiring one or more skilled operators and specialized equipment. For example, the mass flow sensor may be tuned by running known amounts of a known fluid through the sensor portion and adjusting certain signal processing parameters to provide a response that accurately represents fluid flow. For example, the output may be normalized, so that a specified voltage range, such as 0 V to 5 V of the sensor output, corresponds to a flow rate range from zero to the top of the range for the sensor. The output may also be linearized, so that a change in the sensor output corresponds linearly to a change in flow rate. For example, doubling of the fluid output will cause a doubling of the electrical output if the output is linearized. The dynamic response of the sensor is determined, that is, inaccurate effects of change in pressure or flow rate that occur when the flow or pressure changes are determined so that such effects can be compensated.

A bypass may then be mounted to the sensor, and the bypass is tuned with the known fluid to determine an appropriate relationship between fluid flowing in the mass flow sensor and the fluid flowing in the bypass at various known flow rates, so that the total flow through the flow meter can be determined from the sensor output signal. In some mass flow controllers, no bypass is used, and the entire flow passes through the sensor. The mass flow sensor portion and bypass may then be mated to the control valve and control electronics portions and then tuned again, under known conditions. The responses of the control electronics and the control valve are then characterized so that the overall response of the system to a change in set point or input pressure is known, and the response can be used to control the system to provide the desired response.

When the type of fluid used by an end-user differs from that used in tuning and/or calibration, or when the operating conditions, such as inlet and outlet pressure, temperature, range of flow rates, etc., used by the end-user differ from that used in tuning and/or calibration, the operation of the mass flow controller is generally degraded. For this reason, the flow meter can be tuned or calibrated using additional fluids (termed "surrogate fluids") and or operating conditions, with any changes necessary to provide a satisfactory response being stored in a lookup table. U.S. Pat. No. 7,272,512 to Wang et al., for "Flow Sensor Signal Conversion," which is owned by the assignee of the present invention and which is hereby incorporated by reference, describes a system in which the characteristics of different gases are used to adjust the response, rather than requiring a surrogate fluid to calibrate the device for each different process fluid used.

In addition, the mass flow controller 100 may include a pressure transducer 112 coupled to flow path at some point, typically, but not limited to, upstream of the bypass 142 to measure pressure in the flow path. Pressure transducer 112 provides a pressure signal indicative of the pressure. In accordance with the disclosed embodiments, the pressure transducer 112 is used to measure pressure during a rate of decay measurement.

Control electronics 160 control the position of the control valve 170 in accordance with a set point indicating the desired mass flow rate, and an electrical flow signal from the mass flow sensor indicative of the actual mass flow rate of the fluid flowing in the sensor conduit. Traditional feedback control methods such as proportional control, integral control, proportional-integral (PI) control, derivative control, proportional-derivative (PD) control, integral-derivative (ID) control, and proportional-integral-derivative (PID) control may be used to control the flow of fluid in the mass flow controller. A control signal (e.g., a control valve drive signal) is generated based upon an error signal that is the difference between a set point signal indicative of the desired mass flow rate of the fluid and a feedback signal that is related to the actual mass flow rate sensed by the mass flow sensor. The control valve is positioned in the main fluid flow path (typically downstream of the bypass and mass flow sensor) and can be controlled (e.g., opened or closed) to vary the mass flow rate of fluid flowing through the main fluid flow path, the control being provided by the mass flow controller.

In the illustrated example, the flow rate is supplied by electrical conductors 158 to a closed loop system controller 160 as a voltage signal. The signal is amplified, processed and supplied using electrical conductors 159 to the control valve assembly 150 to modify the flow. To this end, the controller 160 compares the signal from the mass flow sensor 140 to predetermined values and adjusts the proportional valve 170 accordingly to achieve the desired flow.

Although FIG. 1 depicts that the mass flow controller 100 includes a thermal mass flow sensor, the mass flow controller 100, in accordance with the disclosed embodiments, may utilize other types of mass flow sensors including a Coriolis type sensor. An advantage of using a Coriolis-based sensor is that it is capable of determining mass flow independent of temperature, flow profile, density, viscosity, and homogeneity.

Figure 2:
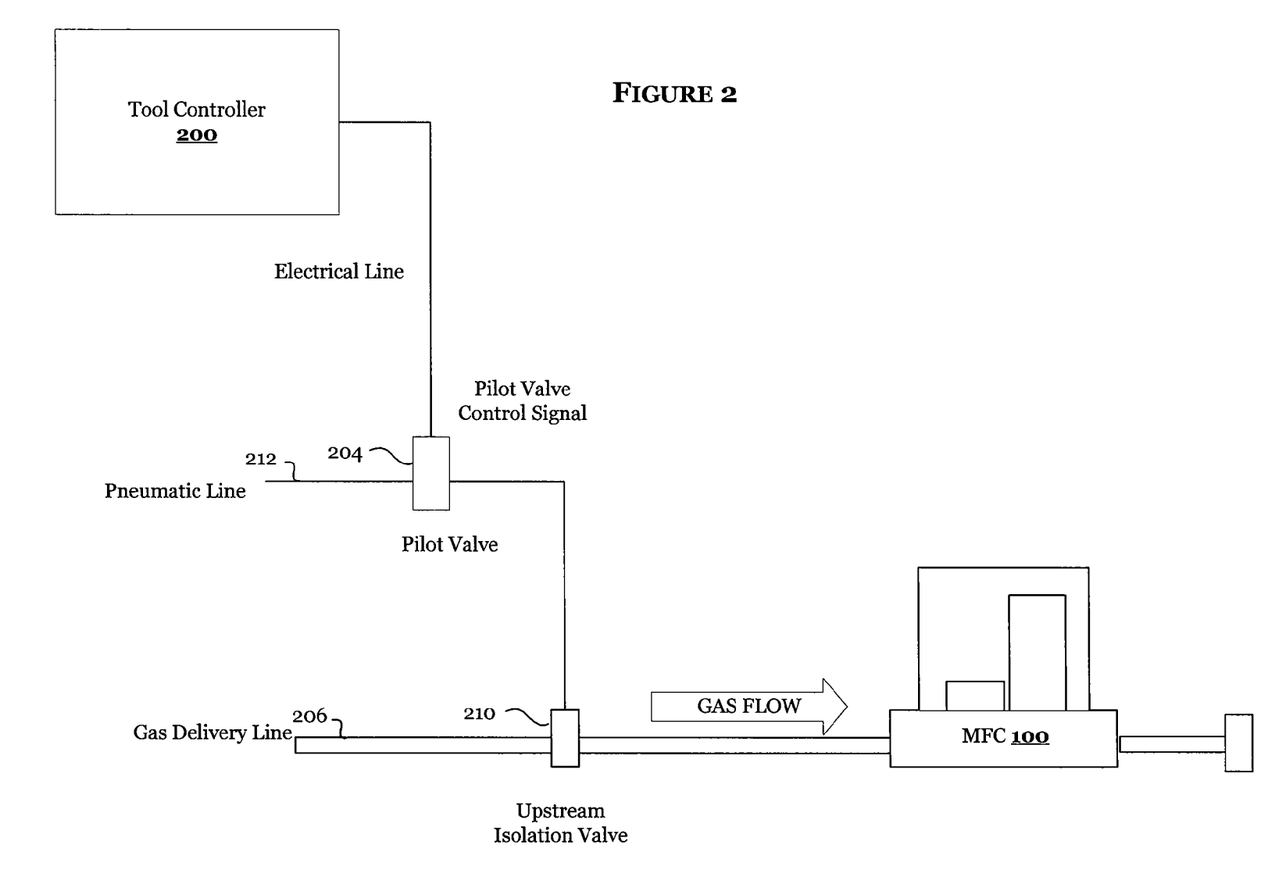
FIG. 2 is a block diagram illustrating a typical environment in which a mass flow controller or mass flow meter is installed on a processing tool.

FIG. 2 is a block diagram illustrating a typical environment in which the mass flow controller 100 is installed on a tool that includes a tool controller 200 that controls delivery of gas to the mass flow controller 100 via a gas delivery line 206. An isolation valve 210 is located upstream of the mass flow controller 100 on the gas delivery line 206. The isolation valve 210 is communicatively coupled to a tool pilot valve 204, which is controlled by the tool controller 200. The isolation valve 210 is typically a normally closed valve. When the tool controller 200 opens the tool pilot valve 204, compressed air from a pneumatic supply line 212 actuates the isolation valve 210 to open. When the tool controller 200 closes the tool pilot valve 204, no air is supplied, causing the isolation valve 210 to close, thereby shutting the gas supply to the mass flow controller 100. Thus, in this environment, only the tool controller 200, and not the mass flow controller 100, is able to control the opening and closing of the isolation valve. Therefore, the mass flow controller 100 cannot on its own initiate a rate of decay measurement to identify any characteristic changes (i.e., performance loss) as it is unable to close the isolation valve 210 to stop the flow of gas to the mass flow controller 100.

Figure 3:
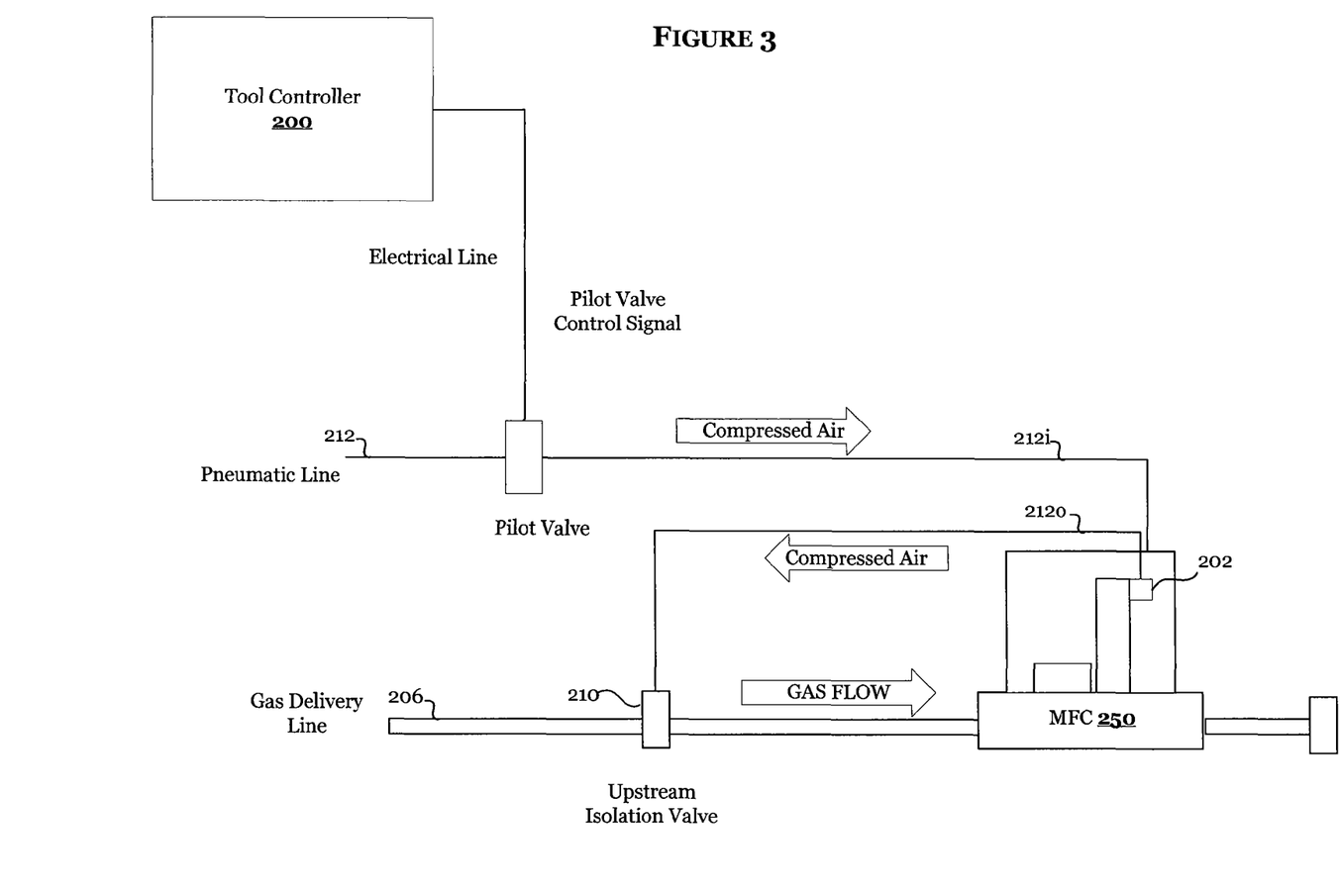
FIG. 3 is a block diagram illustrating an embodiment for providing self-validating mass flow controller in accordance with the disclosed embodiments.

Accordingly, FIG. 3 discloses a first embodiment for providing a self-validating mass flow controller in accordance with the disclosed embodiments. In this embodiment, in order to interrupt the gas supply from the gas delivery line 206, the pneumatic supply line 212 is re-routed through the tool pilot valve 204 to a mass flow controller 250 using connections supplied with the device. The mass flow controller 250 is a modified version of the mass flow controller 100 shown in FIG. 1. The mass flow controller 250 is modified to include an internal valve 202 that is configured to be in series with the tool pilot valve 204. In the depicted embodiment, the isolation valve 210 is externally located upstream of the mass flow controller 250 on the gas delivery line 206. However, in certain embodiments, the isolation valve 210 may be incorporated internally within the mass flow controller 250. Again, the isolation valve 210 is typically a normally closed valve that only opens when compressed air is provided to actuate the isolation valve 210 to open.

Utilizing the disclosed configuration in FIG. 3, it can be seen that the mass flow controller 250 using the internal valve 202 can only interrupt the compressed air when the tool controller 200 supplies it (i.e., when the tool controller opens the pilot valve 204). Thus, in this embodiment, the mass flow controller 250 cannot open the isolation valve 210 if the tool controller 200 does not supply the compressed air. However, utilizing this configuration, the mass flow controller 250 is configured to be able to close the internal valve 202, thereby blocking the compressed air supply which in turn closes the isolation valve 210 to shut off the gas supply to the mass flow controller 250. Once closed, the mass flow controller 250 is configured to initiate and perform a rate of decay measurement. After performing the rate of decay measurement and verifying the results, the mass flow controller 250 may re-open the internal valve 202, thereby, opening the isolation valve 210 to enable gas supply to the mass flow controller 200.

Figure 6:
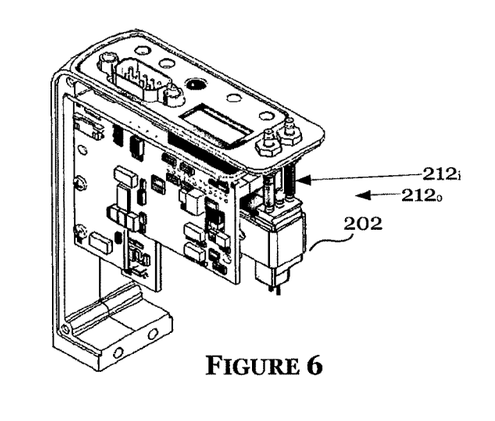
FIGS. 6 through 8 illustrate different embodiments for implementing a self-validating mass flow controller in accordance with a disclosed embodiment.
Figure 7:
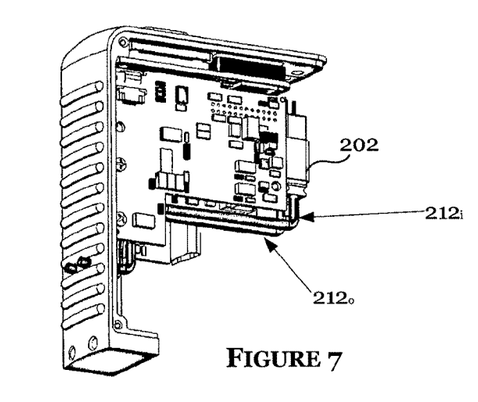
Figure 8:
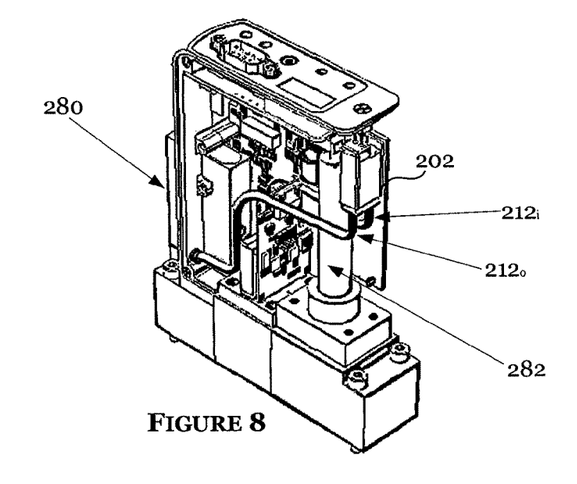

FIGS. 6 through 8 illustrate different embodiments for implementing the mass flow controller 250 as described in FIG. 3. For example, FIG. 6 illustrates a mass flow controller 250 that includes an internal valve 202 that is configured to be in series with the tool pilot valve 204. The internal valve 202 receives a first pneumatic line 212i from the tool pilot valve 204 and routes a second pneumatic line 212o to the isolation valve 210. As can be seen in the illustration, the first and second pneumatic lines are routed through an opening on a top surface of the mass flow controller. However, FIG. 7 illustrates a different embodiment in which the first and second pneumatic lines are routed in and out of the mass flow controller through openings located on a side of the mass flow controller. Further, FIG. 8 illustrates another embodiment in which the first and second pneumatic lines are routed through a mass flow controller having a modified inlet block 280 and a piezo valve 282.

The embodiments depicted in FIGS. 6 through 8 are provided merely as illustrative examples and are not intended to limit the numerous ways of implementing the mass flow controller 250. For instance, while the internal valve 202 is depicted as being in a specific location in each of the illustrated embodiments, the internal valve 202 may be incorporated elsewhere within the mass flow controller 250. Additionally, the openings in the mass flow controller for routing the first and second pneumatic lines may be located in any number of locations on the mass flow controller.

Figure 4:
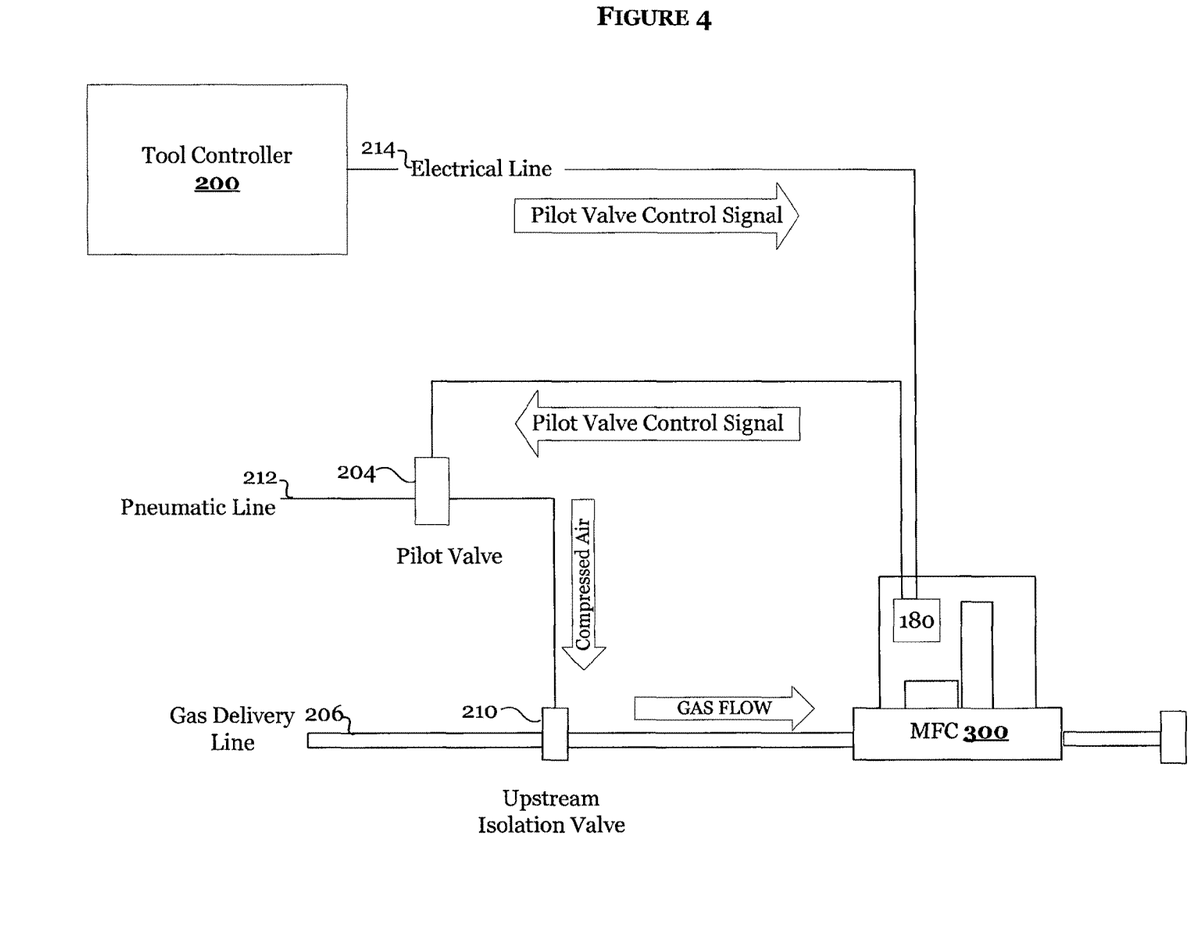
FIG. 4 is a block diagram illustrating a second embodiment for providing self-validating mass flow controller in accordance with the disclosed embodiments.
Figure 5:
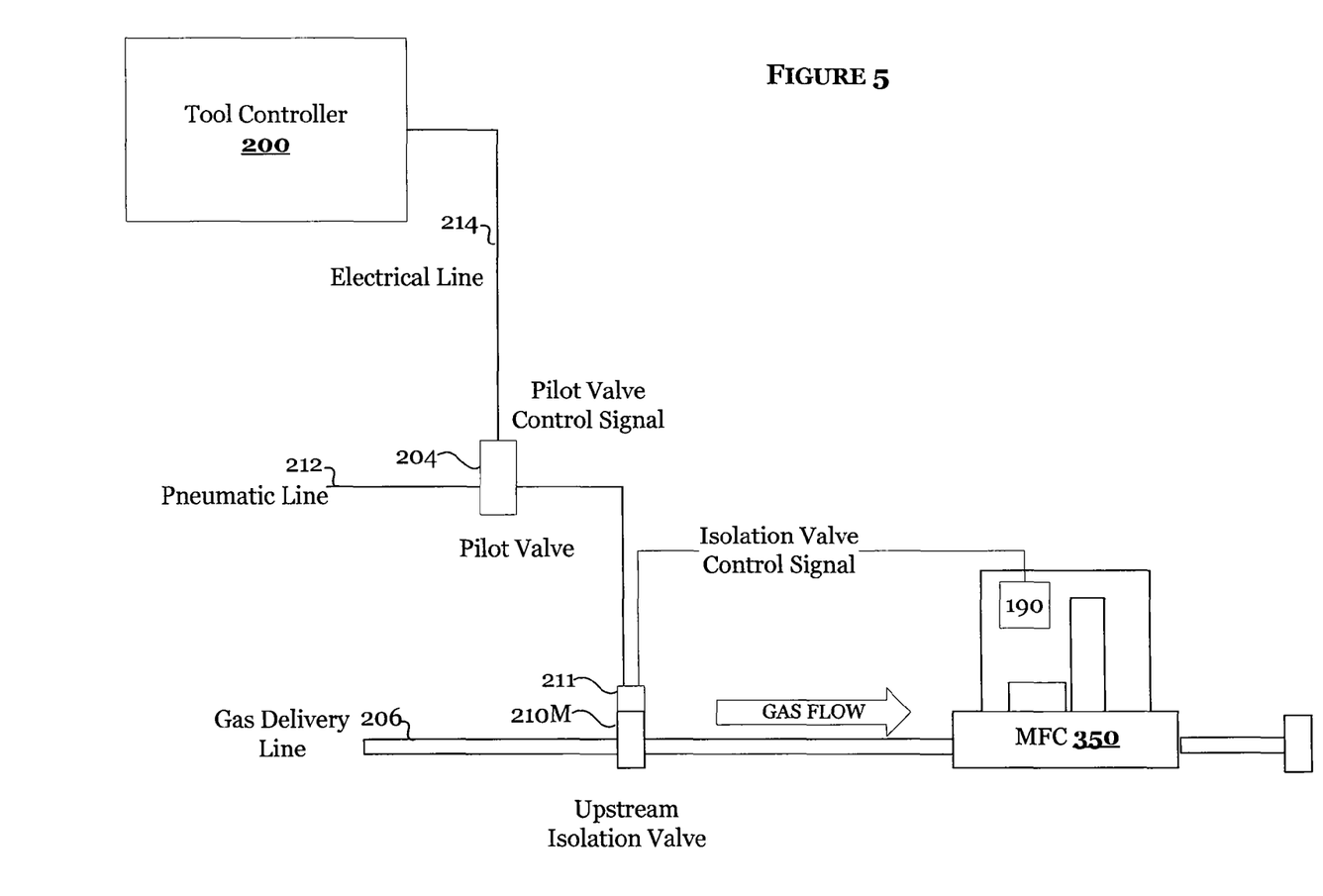
FIG. 5 is a block diagram illustrating a third embodiment for providing self-validating mass flow controller in accordance with the disclosed embodiments.

Moving now to FIGS. 4 and 5, alternative embodiments for providing a self-validating mass flow controller are provided. For example, mass flow controllers 300 and 350, respectively depicted in FIGS. 4 and 5, do not include an internal valve 202, but instead include additional or modified electrical components for enabling the mass flow controllers to transmit a signal that causes the closing of the isolation valve 210. For instance, in regard to FIG. 4, the mass flow controller 300 is configured to include an electrical relay 180 that is in series with the electrical line 214 for controlling the tool pilot valve 204. The electrical relay 180 may be an electrical component of or be controlled by the control electronics 160 of the mass flow controller 300.

In one embodiment, the mass flow controller 300 is configured to be able to send a pilot valve control signal to close the isolation valve 210 for performing a rate of decay measurement during a period when the isolation valve 210 was previously opened by the tool controller 200. After performing the rate of decay measurement and verifying the results, the mass flow controller 300 may send a second pilot valve control signal to re-open the isolation valve 222 to enable gas supply to the mass flow controller 300. In a preferred embodiment, the mass flow controller 300 is configured to not be able to open the isolation valve 210 when the tool controller 200 closes it. An advantage to the embodiment disclosed in FIG. 4 to that of FIG. 3 is that the cost to produce the mass flow controller 300 would be less than that of the mass flow controller 250 as the mass flow controller 300 does not require an additional internal valve component. However, a disadvantage is that it would increase the requirements on the tool wiring.

FIG. 5 presents another embodiment of a mass flow controller 350 that includes an electrical component 190 that is configured to enable the mass flow controller 350 to transmit a signal to an isolation valve 210M that causes the closing of the isolation valve 210M. The isolation valve 210M is a modified version of a typical isolation valve. The isolation valve 210M would include added components for receiving an isolation valve control signal from the mass flow controller 350 and an additional valve 211 that would be able to block the compressed air being received by the pneumatic line 212 in response to receiving the isolation valve control signal from the mass flow controller 350, which in turn causes the isolation valve to 210M to close, thereby preventing the flow of gas to the mass flow controller 350 for enabling the mass flow controller 350 to perform a rate of decay measurement. In one embodiment, the valve 211 is a solenoid valve. Additionally, in certain embodiments, the valve 211 may be a separate component (e.g., a cap) that is configurable to be coupled to existing isolation valves.

As described above, the mass flow controllers (250, 300, and 350) can now control when the isolation valve 210 is closed or open while the process is running based on its own requirement for making the rate of decay measurement. In addition, the mass flow controllers (250, 300, and 350) may be programmed to determine a time necessary for completing a rate of decay measurement, analyze patterns in the processing time to identify processing time segments that would allow the mass flow controller to complete the rate of decay measurement without interfering with the tool process (i.e., the tool does not have to go offline), evaluate the results of a rate of decay measurement, and raise an alarm if its internal rate of decay measurement shows that the characteristics of the mass flow controller have changed by a certain amount in a given period of time. For example, the accuracy at a given setpoint has shifted by more than 2% over a 2 week period. Thus, the disclosed embodiment provides a self-validating mass flow controller that is able to provide real time information without requiring down time to make the measurements.

Further, in certain embodiments, the mass flow controllers (250, 300, and 350) may be configured to self-correct its calibration and offset based on the rate of decay measurement described above.

A number of parameters can be programmed to set limits on the measurement and the results. For example the device could be programmed to make a measurement continuously or automatically every 5 seconds, or 5 minutes, or 5 hours or any other time interval. It could also be programmed to make measurement only at certain setpoints, or only once after each setpoint changes, etc. The mass flow controller could also be configured to not start a rate of decay measurement unless it determines that there is enough time to complete the measurement. The device could also have a number of different measurement modes. For example, a "quick" measurement with lower resolution could be performed often and averaged, while a "maintenance" high resolution mode could be performed during daily maintenance checks that are performed on the tool routinely.

Other parameters may be configured to control the duration of the rate of decay measurement, i.e., how long the upstream valve is set to close to force a pressure decay. For example, this can be controlled by either having a time limit to the measurement or a maximum pressure drop allowed. Limiting either one or both allows measurements to be performed when the process time is limited, such as setpoints that only lasts a few seconds, or to limit the potential perturbations to the flow when the pressure is restored.

The mass flow controllers may also be fitted with extra flash memory to allow for data logging and trending of the various measurements performed inside the mass flow controller, along with time stamps, such as but not limited to the rate of decay measurements, the changes in flow characteristics over time, the changes in device offset and leak through the valve or the tool, maximum pressures and temperatures seen been the device, the requests for zero routines, etc.

Accordingly, as described above, advantages of the disclosed embodiments include, but are not limited to, a system and method for providing a self-validating mass flow controller that eliminates the requirement of having a separate device installed on the tool to perform a rate of decay measurement for checking valve leak. In addition, the disclosed embodiments enable rate of decay measurements to be performed inside of the MFC, with no changes to the existing tool software. This would require no added cost or complexity to the customer because the disclosed modification to the device is backward compatible with existing tool installations. Still, as illustrated in FIGS. 6-8, the disclosed embodiments fit within the footprint/structure of existing mass flow controllers, thus reducing the cost of implementation and maintaining compatibility with current tool configurations. Additionally, the disclosed embodiments would add new diagnostic capabilities to older tools without any requiring any software or hardware modifications (other than perhaps additional wiring) to an existing tool. Moreover, the disclosed embodiments utilizes the existing components on a gas stick (i.e., components along the gas delivery line, such as, but not limited to, the upstream isolation valve), thereby further decreasing cost and maintaining compatibility with existing tools. As an additional benefit, using the upstream isolation valve on the gas stick to stop the flow of gas instead of embedding a dedicated isolation valve in the mass flow controller reduces cost and provides the mass flow controller with more internal volume.

In addition, a benefit in having the mass flow controller control the isolation valve is that the mass flow controller control system operates extremely fast and can make critical calculations and logic decisions that the tool controller would not be able to make within the necessary time constraints. Additionally, because the mass flow controller would be configured by the mass flow controller providers instead of by the operators of the tool, the mass flow controller providers are able to ensure that the mass flow controller is not put in a condition where it would lose control. For example, the mass flow controller would be configured to know the magnitude of the change in pressure that it can tolerate, how big a pressure drop it needs to take an accurate measurement for a given flow rate and inlet pressure, and how long it needs to take an accurate measurement. Additionally, as stated above, the mass flow controller can be configured to make intelligent decisions on when it can take a measurement and can quickly abort a measurement based on a command from a user such as a change in set point or a command to shut off the tool.

While specific details about the above embodiments have been described, the above hardware and software descriptions are intended merely as example embodiments and are not intended to limit the structure or implementation of the disclosed embodiments.

In addition, as outlined above, certain aspects of the disclosed embodiments may be embodied in software that is executed using one or more processing units/components. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives, optical or magnetic disks, and the like, which may provide storage at any time for the software programming.

Those skilled in the art will recognize that the present teachings are amenable to a variety of modifications and/or enhancements. While the foregoing has described what is considered to be the best mode and/or other examples, it is understood that various modifications may be made therein and that the subject matter disclosed herein may be implemented in various forms and examples, and that the teachings may be applied in numerous applications, only some of which have been described herein. Such modifications are intended to be covered within the true scope of the present teachings.

For instance, while the above figures and written description discloses various embodiments of a mass flow controller, the disclosed modifications may similarly be made to a mass flow meter for enabling a self-validating mass flow meter that is operable to initiate a rate of decay measurement for determining a flow rate and/or for determining valve leak. The main difference is that the mass flow meter would not include a controller that operates to adjust the valve to achieve a desired flow rate. The scope of the appended claims is intended to cover mass flow meters as well as mass flow controllers and other similar flow measure/control devices.

The terminology used herein is for describing particular embodiments only and is not intended to be limiting of the invention. As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed.

Many modifications and variations will be apparent to those of ordinary skill in the art without departing from the scope and spirit of the invention. The description of the embodiments were chosen and described to explain the principles of the invention and the practical application, and to enable others of ordinary skill in the art to understand the invention for various embodiments with various modifications as are suited to the particular use contemplated. The scope of the claims is intended to broadly cover the disclosed embodiments and any such modification.

The invention claimed is:

1. A mass flow controller for controlling a flow of a fluid, the mass flow controller comprising:
    an inlet for receiving the fluid from a gas delivery line having an external isolation valve upstream of the inlet;
    a flow path in which the fluid passes through the mass flow controller;
    a mass flow meter for providing a signal corresponding to mass flow of the fluid through the flow path;
    an adjustable valve for regulating the flow of the fluid out of an outlet of the mass flow controller;
    a controller configured to apply a valve control signal to adjust the adjustable valve to a desired valve position to control the flow of the fluid out of an outlet of the mass flow controller;
    a tool pilot valve configured to control application of compressed air to the external isolation valve; and
    an internal valve coupled between a first pneumatic line leading to the tool pilot valve and a second pneumatic line leading to the external isolation valve upstream of the inlet, wherein both a tool controller and the mass flow controller are configured to control the compressed air provided to the second pneumatic line to close the external isolation valve, and wherein the internal valve is configured to interrupt application of the compressed air to the external isolation valve when the tool pilot valve provides the compressed air to the internal valve.

2. The mass flow controller of claim 1, further comprising at least one processing component configured to execute instructions to perform an in-situ rate of decay measurement after executing instructions to close the external isolation valve by using the internal valve to block airflow being received through the first pneumatic line.

3. The mass flow controller of claim 2, wherein the first pneumatic line and the second pneumatic line are routed through an opening on a top surface of the mass flow controller.

4. The mass flow controller of claim 3, wherein the first pneumatic line and the second pneumatic line are routed through an opening on a side surface of the mass flow controller.

5. The mass flow controller of claim 3, wherein the at least one processing component is further configured to execute instructions to identify a length of time for completing a rate of decay measurement, analyze patterns in processing time of a tool that is utilizing the mass flow controller to identify processing time segments that would allow the mass flow controller to complete the rate of decay measurement without interfering with a process of the tool, and perform the in-situ rate of decay measurement during an identified processing time segment.

6. The mass flow controller of claim 3, wherein the at least one processing component is further configured to execute instructions to raise an alarm if the in-situ rate of decay measurement indicates that a characteristic of the mass flow controller has changed by a certain amount in a given period of time.

7. The mass flow controller of claim 3, wherein the at least one processing component is further configured to execute instructions to perform the in-situ rate of decay measurement in one of two different measurement modes.

8. The mass flow controller of claim 3, further comprising memory for internally logging and trending of various measurements performed inside the mass flow controller.

9. The mass flow controller of claim 3, wherein the at least one processing component is further configured to execute instructions to self-correct its calibration and offset based on results of the in-situ rate of decay measurement.

10. A mass flow controller for controlling a flow of a fluid, the mass flow controller comprising:
an inlet for receiving the fluid from a gas delivery line having an external isolation valve upstream of the inlet;
a flow path in which the fluid passes through the mass flow controller;
a mass flow meter for providing a signal corresponding to mass flow of the fluid through the flow path;
an adjustable valve for regulating the flow of the fluid out of an outlet of the mass flow controller;
a controller configured to apply a valve control signal to adjust the adjustable valve to a desired valve position to control the flow of the fluid out of an outlet of the mass flow controller;
a tool pilot valve configured to control application of a closing force to the external isolation valve; and
an electrical relay configured to be coupled between a first electrical line from a tool controller and a second electrical line to the tool pilot valve, wherein both the tool controller and the mass flow controller are configured to control an electrical signal provided along the second electrical line to the tool pilot valve to close the external isolation valve, and wherein the electrical relay is configured to interrupt application of the electrical signal to the second electrical line when the tool controller applies the electrical signal to the first electrical line.

11. The mass flow controller of claim 10, further comprising at least one processing component configured to execute instructions to perform an in-situ rate of decay measurement after executing instructions to close the external isolation valve by sending a close valve signal to the tool pilot valve via the second electrical line.

12. The mass flow controller of claim 11, wherein the at least one processing component is further configured to execute instructions to identify a length of time for completing a rate of decay measurement, analyze patterns in processing time of a tool that is utilizing the mass flow controller to identify processing time segments that would allow the mass flow controller to complete the rate of decay measurement without interfering with a process of the tool, and perform the in-situ rate of decay measurement during an identified processing time segment.

13. The mass flow controller of claim 11, wherein the at least one processing component is further configured to execute instructions to perform the in-situ rate of decay measurement in one of two different measurement modes.

14. The mass flow controller of claim 11, wherein the at least one processing component is further configured to execute instructions to self-correct its calibration and offset based on results of the in-situ rate of decay measurement.

15. A mass flow controller for controlling a flow of a fluid, the mass flow controller comprising:
an inlet for receiving the fluid from a gas delivery line having an external isolation valve upstream of the inlet;
a flow path in which the fluid passes through the mass flow controller;
a mass flow meter for providing a signal corresponding to mass flow of the fluid through the flow path;
an adjustable valve for regulating the flow of the fluid out of an outlet of the mass flow controller;
a controller configured to apply a valve control signal to adjust the adjustable valve to a desired valve position to control the flow of the fluid out of an outlet of the mass flow controller;
a pilot valve configured to control application of an opening force to the external isolation valve; and
an electrical relay configured to be coupled to the external isolation valve, wherein the electrical relay is configured to control an additional valve of the external isolation valve to control a supply of the opening force from the pilot valve to the external isolation valve, wherein the electrical relay is configured to prevent application of the opening force to the external isolation valve when the electrical relay controls the additional valve to an open position.

16. The mass flow controller of claim 15, further comprising at least one processing component configured to execute instructions to perform an in-situ rate of decay measurement after executing instructions to close the external isolation valve by sending a close valve signal to the external isolation valve.

17. The mass flow controller of claim 16, wherein the at least one processing component is further configured to execute instructions to identify a length of time for completing a rate of decay measurement, analyze patterns in processing time of a tool that is utilizing the mass flow controller to identify processing time segments that would allow the mass flow controller to complete the rate of decay measurement without interfering with a process of the tool, perform the in-situ rate of decay measurement during an identified processing time segment, and raise an alarm if the in-situ rate of decay measurement indicates that a characteristic of the mass flow controller has changed by a certain amount in a given period of time.

18. The mass flow controller of claim 16, wherein the at least one processing component is further configured to execute instructions to perform the in-situ rate of decay measurement in one of two different measurement modes.

19. The mass flow controller of claim 16, wherein the at least one processing component is further configured to execute instructions to self-correct its calibration and offset based on results of the in-situ rate of decay measurement.

20. An isolation valve comprising:
   a first valve configured to be coupled to a pneumatic line, the first valve configured to open in response to receiving air flow from the pneumatic line;
   a second valve in direct physical contact with the first valve, the second valve configured to open in response to receiving a first electrical signal from a mass flow controller and to provide the air flow from the pneumatic line to the first valve in response to opening; and
   a third valve configured to receive a second electrical signal from a tool controller, the third valve operable to block the air flow from the pneumatic line to cause the first valve to close.

* * * * *